United States Patent

Merkler

[11] Patent Number: 6,058,805
[45] Date of Patent: May 9, 2000

[54] INTERMITTENT DIFFERENTIAL BREATHER ASSEMBLY

[75] Inventor: Michael B. Merkler, Fort Wayne, Ind.

[73] Assignee: Navistar International Transportation Corp, Chicago, Ill.

[21] Appl. No.: 09/109,618

[22] Filed: Jul. 2, 1998

[51] Int. Cl.[7] .................................................. F16H 57/02
[52] U.S. Cl. .......................................... 74/607; 74/606 R
[58] Field of Search .................................. 74/607, 606 R, 74/606 A

[56] References Cited

U.S. PATENT DOCUMENTS

| | | |
|---|---|---|
| 4,151,761 | 5/1979 | Nishikawa et al. . |
| 4,454,717 | 6/1984 | Wade et al. . |
| 4,498,353 | 2/1985 | Kitade . |
| 4,506,562 | 3/1985 | Yamaura et al. . |
| 4,970,913 | 11/1990 | Kielar et al. . |
| 5,435,454 | 7/1995 | Ishii . |
| 5,724,864 | 3/1998 | Rodgers et al. ..................... 74/606 R |

*Primary Examiner*—Mary Ann Battista
*Attorney, Agent, or Firm*—Jeffrey P. Calfa; Dennis Kelly Sullivan

[57] ABSTRACT

An assembly that removes air from the housing of an axle assembly in combination with the axle assembly for use with a vhicle. The assembly is vomprised of a modified differential housing having an air flow channel therein extending from an inner chamber of the housing to a face of the differentiao housing which abuts ayoke of a drive shaft, the channel emptying into an area over which an seal protector is engaged for protecting a seal provided between the yoke and the differential, the seal protector having an edge port in a circumferential edge thereof which aligns with a cooperating cored hole in a corresponding circumferential area of the housing intermittently, the seal protector being engaged to the drive shaft yode and rotating therewith. The intermittent alignment of the edge port and the cored hole allows venting of the inner chamber of the differential housing to the outside atmosphere.

12 Claims, 4 Drawing Sheets

INTERMITTENT DIFFERENTIAL BREATHER ASSEMBLY

BACKGROUND OF THE INVENTION

The present invention relates to an intermittent breather assembly for a differential housing of an axle assembly for a mobile vehicle, such as a medium or heavy duty truck. More specifically the assembly comprises a novel seal protector for use with a modified differential housing, the assembly creating a breather for the differential which operates intermittently upon rotation of a drive shaft of the vehicle functionally engaged to the differential.

PRIOR ART

It has been long established that a breather is required for a closed axle assembly wherein a lubricant is agitated by mechanical structures, creating heat which results in a pressure increase in the air above the lubricant which must be vented to atmosphere to avoid pressure buildup and binding of rotating components in the housing of the system.

Such breather for a differential mechanism has typically allowed only for indirect venting by providing a plug incorporating an air passage which extends upwardly through an axle housing of the axle assembly are functionally engaged to the differential. These prior art breathers were always open acting to release air.

Further, breathers of this type commonly malfunction due to blockage by contaminants from vehicle road travel such as mud. Still further, when a vacuum is formed within the differential by rapid cooling of same when a puddle is engaged, such breather allows water to be drawn into the differential, diluting the lubricant therein and causing the potential for bearing failure.

Accordingly, it is desirable to provide a breather which does not incorporate such drawbacks and which allows for direct venting of the differential to atmosphere.

SUMMARY OF THE INVENTION

Accordingly, it is a primary object of the invention to provide a breather assembly for a differential which will vent directly to atmosphere, which will not allow water to drawn therethrough into the differential housing, and which will not be easily blocked by contaminants from the ambient environment, rending same inoperative.

These objects as well as others are met by the assembly of the present invention which comprises a modified differential housing having an air flow channel therein extending from an inner chamber of the housing to a face of the differential housing which engages a yoke of a drive shaft, the channel emptying into an area over which an oil seal protector is engaged for protecting a seal provided between the drive shaft yoke and the differential, the seal protector having a port in a circumferential edge thereof which aligns with a cooperating hole cored into a corresponding circumferential area of the housing intermittently due to drive shaft rotation, the seal protector being engaged to the drive shaft yoke and rotating therewith.

DESCRIPTION OF THE PREFERRED EMBODIMENT

Figure 1:
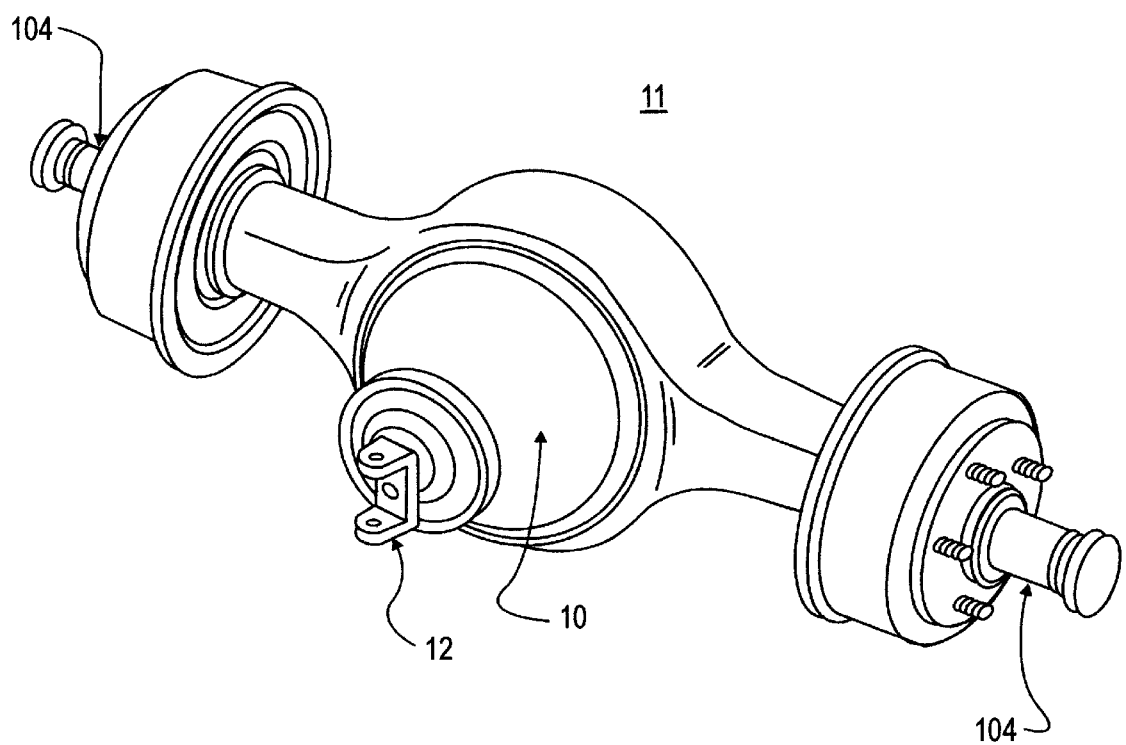
FIG. 1 is a perspective view of an axle assembly of a type which may incorporate an intermittent differential breather assembly made in accordance with this invention.
Figure 2:
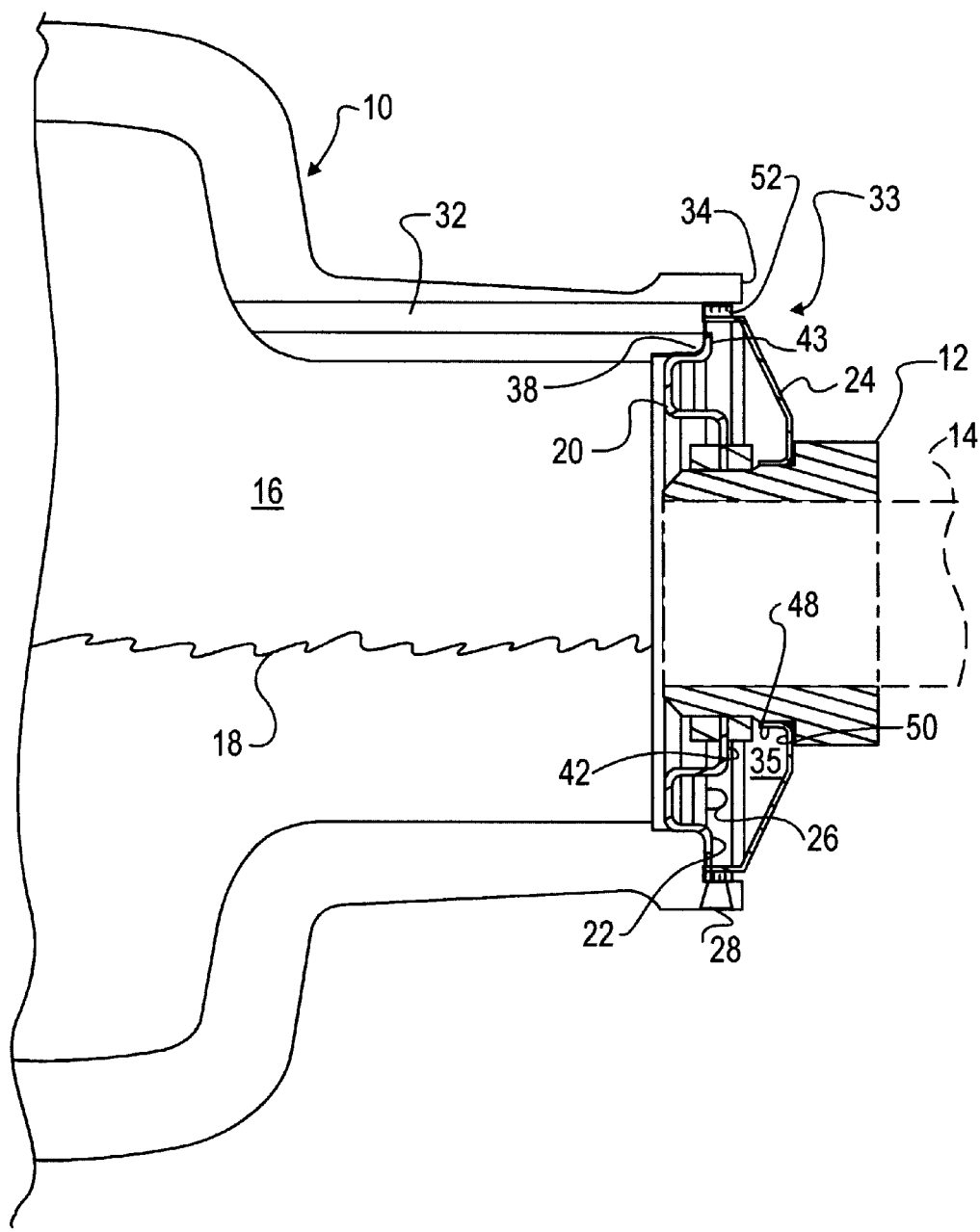
FIG. 2 is a cross sectional view through a breather assembly made in accordance with the present invention and shows a portion of a modified differential housing which includes a face within and to which a yoke of a drive shaft is rotatably engaged, showing an oil seal provided between the structures, and showing the housing modifications to cooperate with a seal protector of novel design engaged upon the yoke and rotating therewith to create an intermittent breather for the differential which vents directly to atmosphere.

Referring now to the drawings in greater detail, there is illustrated therein a portion of a modified differential housing 10 of an axle assembly 11 for a vehicle which is functionally engaged to a drive shaft yoke 12 of a drive shaft 14 of the vehicle For the sake of clarity, known operating structures typically present within an inner chamber 16 of the housing 10 have not been shown, it being understood that the drive shaft 14 is drivingly engaged by the yoke 12 thereof to such structures, in known manner. These operating structures include the differential gearing (not shown) to transmit the rotational energy of the drive shaft 14 to an axle 104 of the axle assembly 11.

There is, however, shown an illustrative level of lubricant 18 within the chamber 16 of the housing 10 which, when agitated by the operating structures therein, creates heat which results in a pressure increase in the air above the lubricant 18 within the chamber 16. Such air must be allowed to vent to atmosphere in order to avoid an adverse increase in pressure or vapor binding of mechanical components within the housing 10.

Also shown is an oil seal 20 which typically surrounds the yoke 12 and extends into engagement with the housing 10 to create a fluid tight juncture between the yoke 12 and the housing 10. It will be understood that an outer face 22 of the differential housing 10, as it may be applied to a rear axle 11 of a vehicle (not shown), faces forwardly, toward a vehicle transmission (not shown) from which the drive shaft 14 extends. Accordingly, as the vehicle is operated, environmental artifacts such as mud, water, dirt, etc. are met head on by this seal 20, causing corrosion thereof and decreasing its useful life.

To increase seal 20 longevity, it has been found that placement of a seal protector 24 thereover, which takes the environmental buffeting in place of the seal 20, has accomplished the goal.

An intermittent air path from the inner chamber 16 to the outside environment is provided through the housing 10 to the outer face 22 and then through the seal protector 24 and then outwards as follows. The seal protector 24, an inherent component of the axle assembly 11, is engaged to the drive shaft yoke 12 and incorporates a circumferential edge port 26 which coacts with a cored hole 28 incorporated into the housing 10. An air passageway, channel 32, is also incorporated into the housing 10 to extend through the housing 10 from the inner chamber 16 to the outer face 22. This air path is intermittently opened due to rotation of the yoke 12 and drive shaft 14. The above components comprise an intermittent differential breather assembly 40 for directly venting the inner chamber 16 to atmosphere. Thus, the provision of a separate breather on a cooperating axle housing becomes extraneous.

The intermittent differential breather assembly 40 described herein not only provides a means by which the differential inner chamber 16 is vented to atmosphere directly, but also substantially eliminates the potential for dilution of the lubricant 18 by water entering the inner chamber 16 via the assembly 40 due to vacuum formation. Venting occurs regardless of pressure buildup in the inner chamber 16.

Perusal of the Figures will show that the channel 32 extends horizontally through an uppermost area 33 of the housing 10 which leads from the differential chamber 16 to the outer face 22 with the housing 10 being positioned in its functional orientation shown. The outer face 22 is recessed in this embodiment and is circumferentially girded by a flange 34 of the housing 10 which is upstanding, relative to the outer face 22.

It will be understood that the outer face 22 is substantially circular when viewed head on, with the yoke 12 engaging therethrough at a substantially centered position. The channel 32 will be understood to exit the outer face 22 at a point substantially above the yoke 12 and radially outwardly of a point at which a periphery 43 of the seal 20 engages against a cooperating inner shoulder 38 of the outer face 22 in fluid tight manner, the channel 32 thus allowing air heated and pressurized in the chamber 16 to escape therefrom into a ring like space 35 defined between an outer surface 42 of the seal 20 and an inner concave surface 44 of the seal protector 24 which faces the seal surface 42.

Figure 3:
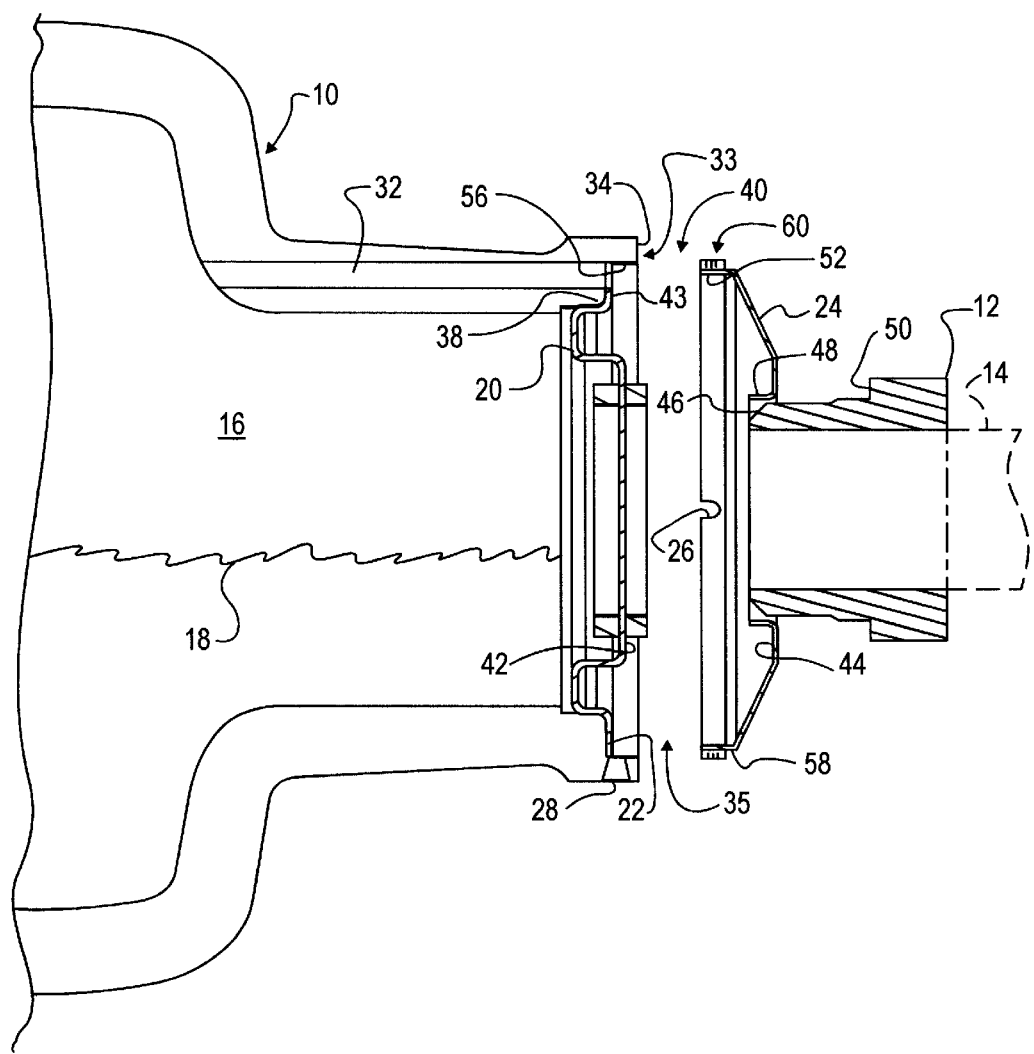
FIG. 3 is an exploded cross sectional view similar to that of FIG. 2.
Figure 4:
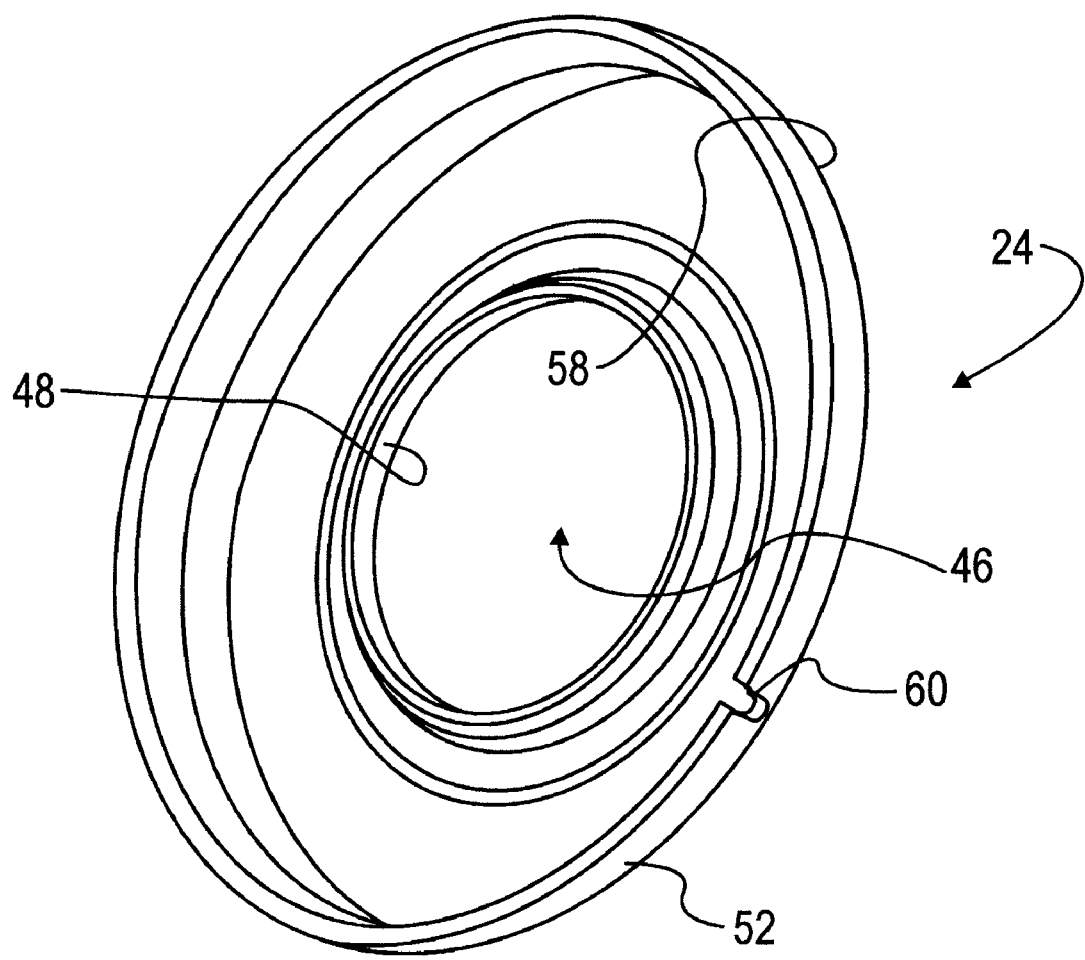
FIG. 4 is a perspective view of the seal protector of the assembly of FIG. 2 showing the seal protector to comprise a dished element incorporating a port in a circumferential edge thereof.

The seal protector 24 can be seen in FIG. 3 to comprise a dished element having a center port 46 therein through which the yoke 12 slides until an underturned periphery 48 of the center port 46 abuts against and is fixed to a biasing flange 50 of the yoke 12 in a manner to be rotatable therewith, and with a circular outer periphery 52 of the seal protector 24 depending into a ring-like space 35 in a manner to abut against the outer face 22 and an inner surface 56 of the flange 34 of the housing 10.

To ensure integrity in the area of abutment between the outer periphery 52 of the seal protector 24 and the flange 34, an outer surface 58 of the outer periphery 52 of the seal protector 24 is provided with with an area of serrations 60, providing the outer periphery 52 with increased flexibility relative to that of the remainder of the protector 24, so that a tight relative positioning between the protector 24 and the flange 34 is ensured.

At some circumferential point along this area of serrations 60, there is provided the edge port 26 which intermittently aligns with the cored hole 28 through the flange 34 of the housing 10. The cored hole 28 is positioned at a lowermost point about the flange 34 and is vertically oriented in the embodiment shown in the figures.

When an alignment takes place between the edge port 26 in the seal protector 24 and the cored hole 28 in the flange 34 due to rotation of the seal protector 24 with the yoke 12, pressurized air from within the differential chamber 16, having passed along the channel 32 and into the ring-like space 35 between the seal protector 24 and the seal 20 is expelled in short bursts through the aligned edge port 26 and the cored hole 28, venting to atmosphere.

Further, due to the relatively short duration of the intermittent breathing alignments, if a situation were to arise where cooling of the differential chamber 16 took place to a degree sufficient to create a vacuum within the chamber 16, potential dilution of the lubricant 18 by water drawn in through assembly 40 would be virtually eliminated. Additionally, the tortuous path such diluting water would need to take to the inner chamber 16 also contributes to inhibiting water intrusion to the lubricant 18.

Still further, vertical orientation of the cored hole 28 in the flange 34 provides for gravitational clearing of anything that might block the cored hole 28.

As defined above, the intermittent differential assembly 40 of the present invention provides a number of advantages, some of which have been described above and others of which are inherent in the invention. Further, modifications of the intermittent differential breather assembly 40 may be proposed without departing from the teachings herein. Accordingly, the scope of the invention is only to be limited as necessitated by the accompanying claims.

I claim:

1. An intermittent differential breather assembly in combination with an axle assembly for use in a vehicle which has a drive shaft, comprising:
   (a) a differential housing;
   (b) said differential housing defining an inner chamber;
   (c) said differential housing having a channel leading from said inner chamber to an outer face of said differential housing;
   (d) a rotatable drive shaft yoke;
   (e) said yoke engaged to the drive shaft;
   (f) a seal protector engaged to said yoke;
   (g) said seal protector extending over a seal and said channel;
   (h) said seal is engaged to said outer face of said differential housing and said seal surrounds said yoke and extends into engagement with said differential housing to create a fluid tight juncture between said yoke and said differential housing;
   (i) said seal protector has an outer circumferential edge with a circumferential edge port; and
   (j) said edge port intermittently aligns with a cooperating cored hole in said housing upon rotation of the drive shaft, said yoke, and said seal protector, thereby venting said inner chamber to atmosphere.

2. The breather assembly of claim 1, wherein said outer face of said differential housing is recessed and is circumferentially girded by a flange which is upstanding relative to said outer face.

3. The breather assembly of claim 2, wherein said cored hole is cored through said flange.

4. The breather assembly of claim 3, wherein said outer circumferential edge of said seal protector abuts against and along an inner surface of said flange and against said outer face of said housing.

5. The breather assembly of claim 4, wherein said channel extends horizontally and exits at an uppermost position on said outer face.

6. The breather assembly of claim 5, wherein said cored hole in said flange extends vertically through said flange at a lower most position therealong.

7. The breather assembly of claim 6, wherein said seal protector comprises a dished element having a concave surface which faces said seal.

8. The breather assembly of claim 7, wherein said channel empties into a ring-like space defined between said seal protector, said outer face, and said seal.

9. The breather assembly of claim 8, wherein an outer periphery of said seal protector has an area of serrations where said seal protector abuts said inner surface of said flange.

10. The breather assembly of claim 9, wherein said seal protector includes a center port therein through and within which said yoke is received.

11. The breather assembly of claim 10, wherein said seal protector abuts against a biasing flange of said yoke and has an underturned periphery which is fixed to a biasing flange of said yoke in a manner to be rotatable therewith.

12. The breather assembly of claim 11, wherein said seal protector is biased against said outer face of said differential housing by said biasing flange of said yoke.

* * * * *